United States Patent
Ariyoshi

(10) Patent No.: US 8,128,260 B2
(45) Date of Patent: Mar. 6, 2012

(54) SPREAD LENS WITH REFRACTION PARTS, AND LIGHTING DEVICE

(75) Inventor: Tetsuo Ariyoshi, Osaka (JP)

(73) Assignee: Samsung LED Co., Ltd., Gyunggi-do (KR)

( * ) Notice: Subject to any disclaimer, the term of this patent is extended or adjusted under 35 U.S.C. 154(b) by 221 days.

(21) Appl. No.: 12/195,518

(22) Filed: Aug. 21, 2008

(65) Prior Publication Data

US 2009/0296405 A1    Dec. 3, 2009

(30) Foreign Application Priority Data

May 29, 2008    (KR) .................. 10-2008-0050054

(51) Int. Cl.
F21V 5/04     (2006.01)
F21V 3/04     (2006.01)
H01J 63/02    (2006.01)

(52) U.S. Cl. .............. 362/311.02; 362/311.06; 362/337; 362/340; 313/512

(58) Field of Classification Search ................. 362/97.3, 362/311.01, 311.02, 311.03–311.05, 311.06, 362/311.09, 311.15, 335, 336, 337, 339, 362/340; 313/512
See application file for complete search history.

(56) References Cited

U.S. PATENT DOCUMENTS

| | | | | |
|---|---|---|---|---|
| 1,021,104 A | * | 3/1912 | Kellner | 362/337 |
| 1,676,464 A | * | 7/1928 | Ryan | 362/309 |
| 2,072,849 A | * | 3/1937 | Dietrich | 362/509 |
| 2,220,639 A | * | 11/1940 | Borsarelli | 362/333 |
| 3,309,554 A | * | 3/1967 | De Lorenzo | 313/111 |
| 4,266,534 A | * | 5/1981 | Ogawa | 600/177 |
| 4,583,151 A | * | 4/1986 | Nagel | 362/29 |
| 4,651,261 A | * | 3/1987 | Szekacs | 362/309 |
| 2004/0061810 A1 | | 4/2004 | Lowery et al. | |
| 2006/0044806 A1 | * | 3/2006 | Abramov et al. | 362/337 |
| 2006/0083000 A1 | * | 4/2006 | Yoon et al. | 362/311 |
| 2009/0116245 A1 | | 5/2009 | Yamaguchi | |
| 2009/0161360 A1 | * | 6/2009 | Li et al. | 362/235 |

FOREIGN PATENT DOCUMENTS

| | | |
|---|---|---|
| JP | 60-179056 | 11/1985 |
| JP | 62-139367 | 6/1987 |
| JP | 04-099074 | 3/1992 |
| JP | 2004-118205 | 4/2004 |
| JP | 2009-117207 | 5/2009 |
| KR | 10-2005-0012372 A | 2/2005 |
| KR | 10-0770424 B1 | 10/2007 |

OTHER PUBLICATIONS

Japanese Office Action, with English Translation, issued in Japanese Patent Application No. 2008-192105, dated May 24, 2011.

* cited by examiner

*Primary Examiner* — Ismael Negron
(74) *Attorney, Agent, or Firm* — McDermott Will & Emery LLP

(57) ABSTRACT

A spread lens including a first lens surface through which the emitted light from the light emitting device is inputted; a second lens surface spreading the inputted light to an outside; refraction parts which extend between both side ends of each of the first and second lens surfaces, are formed in a concave-convex shape, and refract the emitted light from the light emitting device; and support parts which extend at both side ends of the second lens surface and separate the refraction parts and the light emitting device from each other.

8 Claims, 6 Drawing Sheets

[FIG. 1]
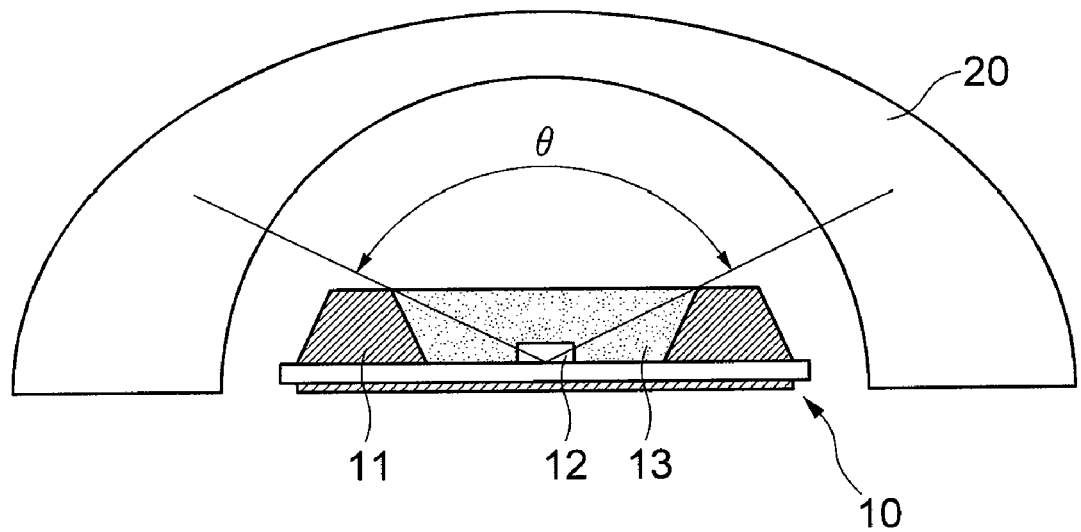
- Prior Art
[FIG. 2]
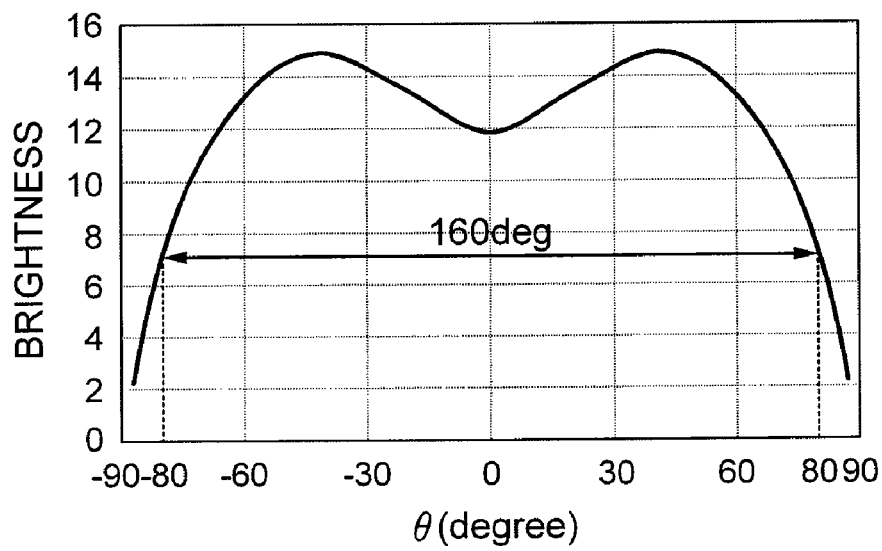
- Prior Art

[FIG. 3]
120
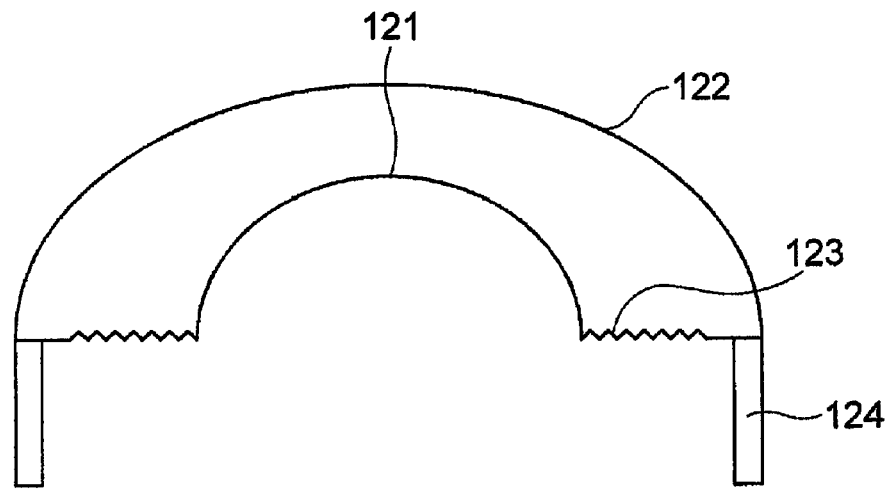
[FIG. 4]
100
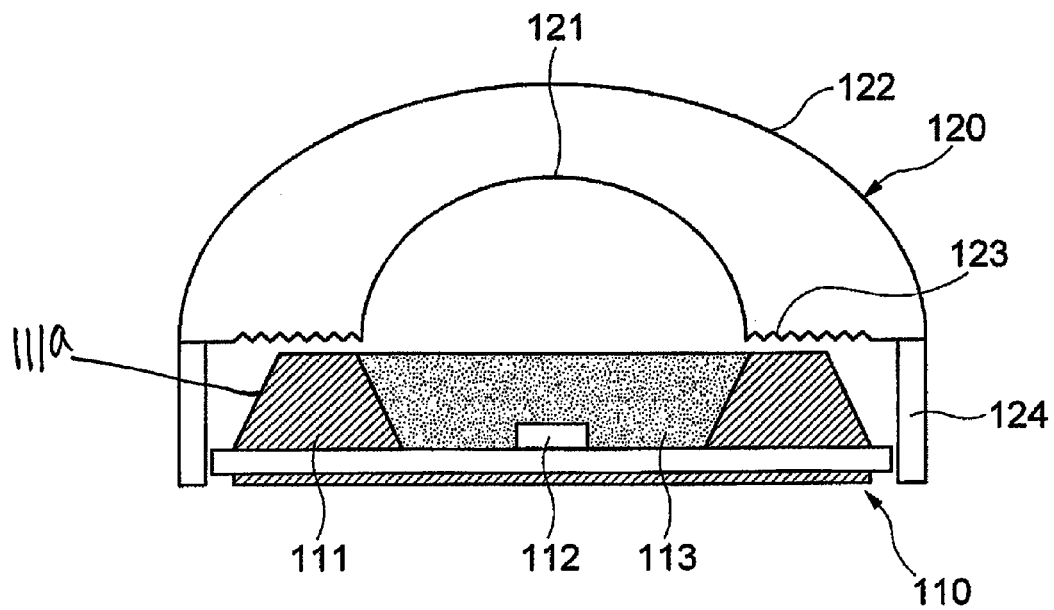

[FIG. 5]
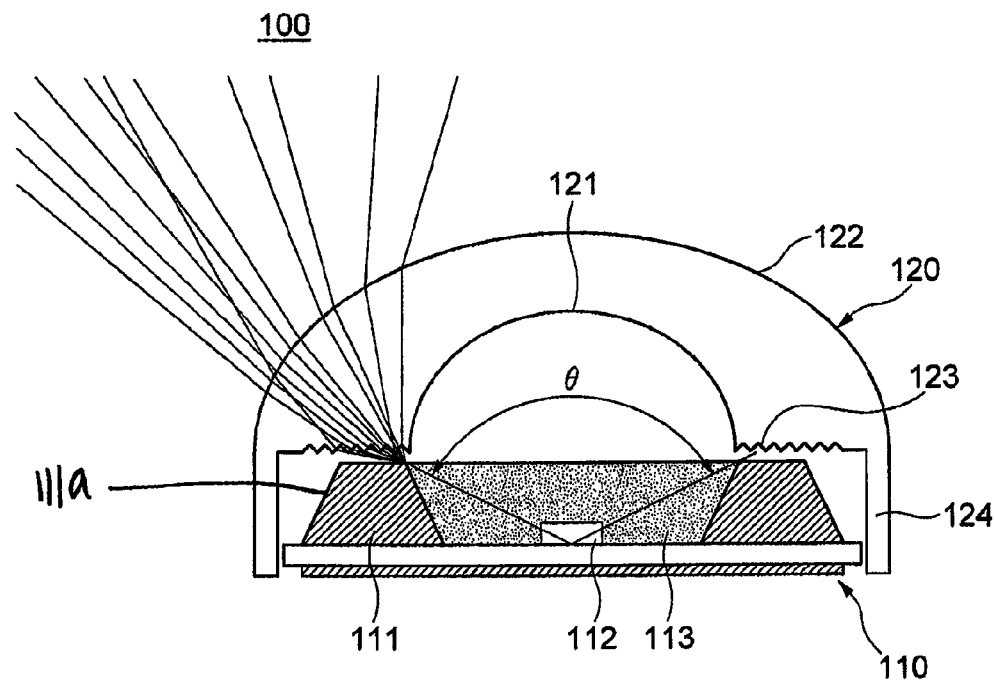
[FIG. 6]
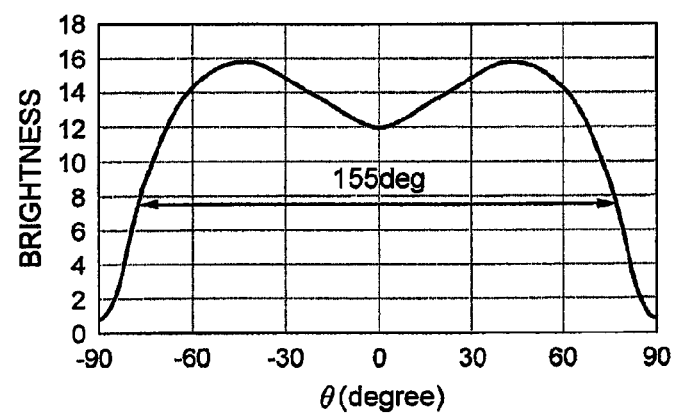

[FIG. 7]
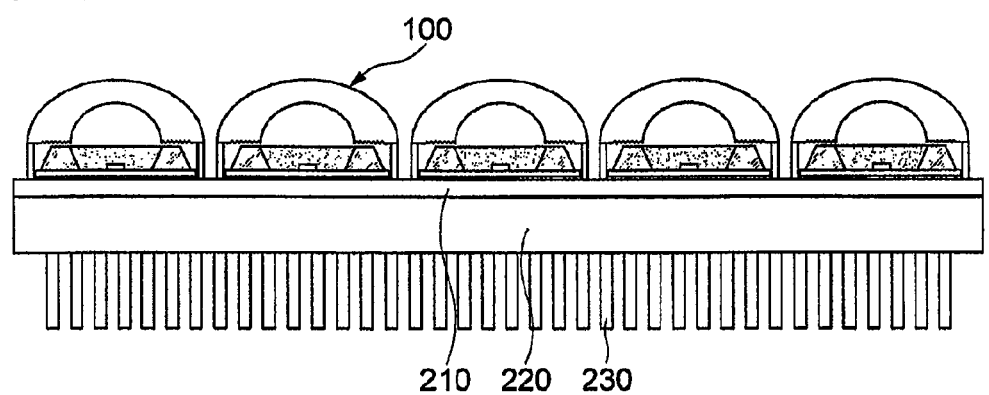
[FIG. 8]
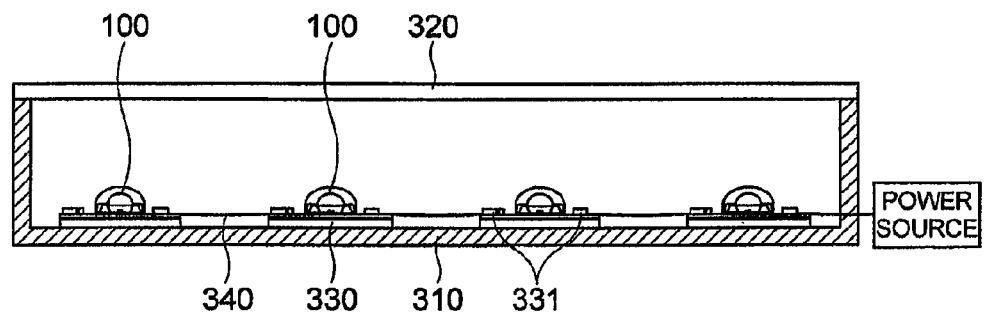

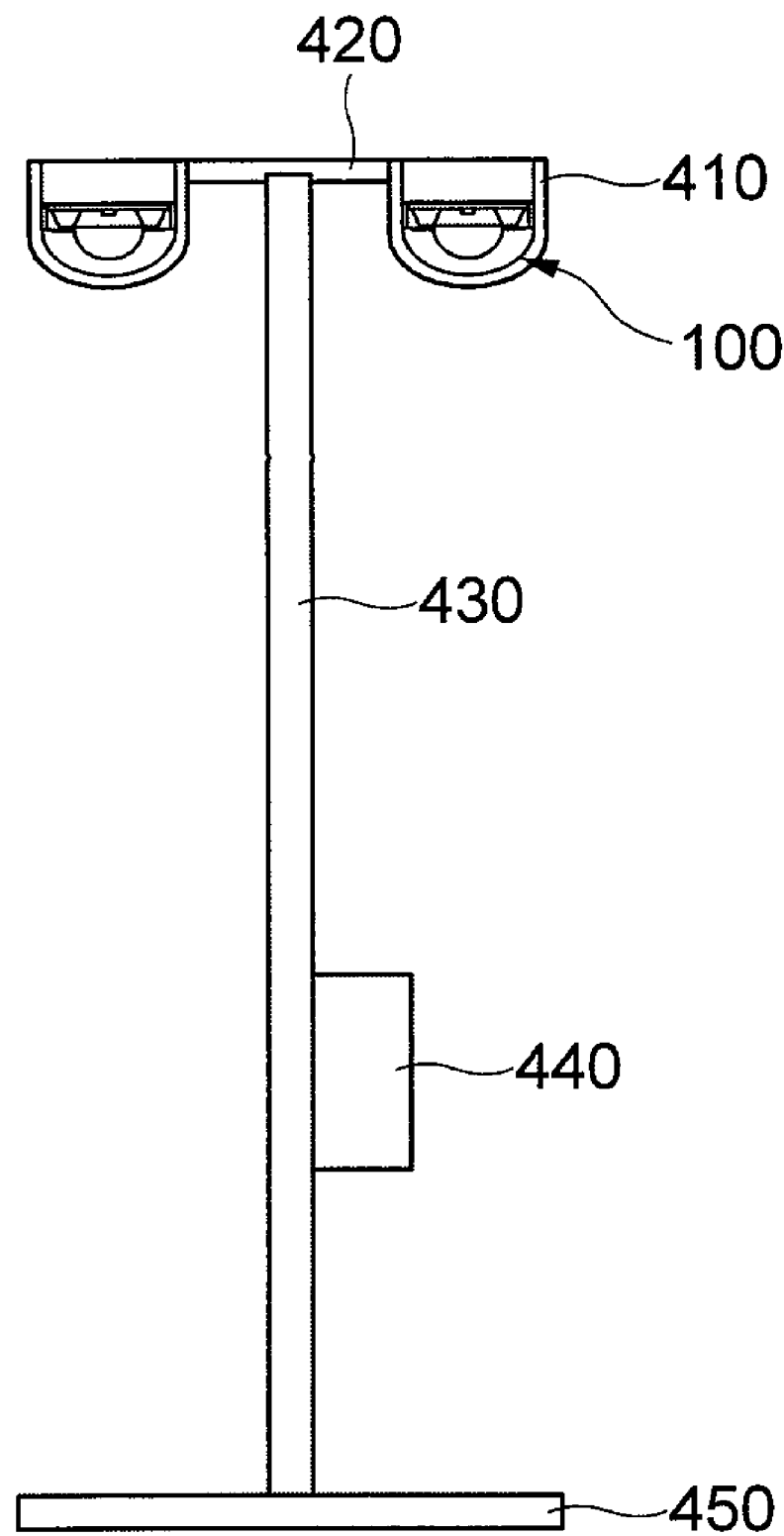
[FIG. 9]

NEW DRAWINGS though the present invention as described above
SPREAD LENS WITH REFRACTION PARTS, AND LIGHTING DEVICE

CROSS-REFERENCE TO RELATED APPLICATIONS

This application claims the benefit of Korean Patent Application No. 10-2008-0050054 filed with the Korea Intellectual Property Office on May 29, 2008, the disclosure of which is incorporated herein by reference.

BACKGROUND OF THE INVENTION

1. Field of the Invention

The present invention relates to a spread lens and a light emitting device assembly using the same; and more particularly to, a spread lens and a light emitting device assembly using the same capable of improving a spread characteristic of light emitted from a light emitting device by forming a concave-convex refraction parts on planar surfaces at both ends thereof.

2. Description of the Related Art

Generally, a light emitting diode (LED) is an electronic component generating a small number of carriers (electrons or holes) injected by using a p-n junction structure of a semiconductor and emitting light through recoupling of the carriers. That is, the electrons and the holes are recoupled to each other while moving through a junction portion of an anode and a cathode by applying a forward voltage to a semiconductor of a specific element. At this time, since the recoupled electrons and holes have energy lower than separated electrons and holes, a difference in energy generated at this time results in emitting the light.

Such light emitting diode is widely used in home appliances, a remote controller, an electric signboard, various automatic teller machines, and the like since it can emit high-efficiency light at a low voltage.

In particular, resistors, condensers, noise filters, and the like which are various components of telecommunication apparatuses have been further miniaturized in accordance with miniaturization and slimness trends of the telecommunication apparatuses, and the light emitting diode has been also fabricated in a surface mount device (SMD) type in order to directly mount the light emitting diode on a printed circuit board (PCB).

Hence, an LED (Light Emitting Diode) lamp has been also developed in the SMD type. Such surface mount device type lamp may replace a conventional simple lighting lamp and is used as a lighting display, a letter display, an image display, and the like.

As a usage field of the light emitting diode has been widen, required efficiency of luminance is also gradually increased, research thereon has been in progress.

Hereinafter, a light emitting device assembly with a spread lens in prior art will be described with reference to the accompanying drawings.

FIG. 1 is a cross-sectional view of the light emitting device assembly in the prior art and FIG. 2 is a graph illustrating a light emitting angle of FIG. 1.

First, as shown in FIG. 1, the light emitting device assembly in the prior art includes a light emitting device package 10 and a spread lens 20 coupled onto the light emitting device package 10.

At this time, the light emitting device package 10 includes a frame 11 mounted with the light emitting device 12 and a molded resin 13 formed at a bent portion of the frame 11.

The spread lens 20 is formed in a convex shape and is formed to cover an upper part and both side parts of the light emitting device package 10.

As shown in FIG. 2, the light emitting device of such configuration can emit light emitted from the light emitting device 12 at an angle in the range of +80° to −80°, that is, approximately 160°.

However, since the spread lens 20 having a center portion thicker than both side is formed to cover the both side parts of the light emitting device package 10, the light emitting device in the prior art has a limitation in miniaturization and slimness.

SUMMARY OF THE INVENTION

Accordingly, the present invention is made to solve the above-described problem and it is, therefore, an object of the present invention to provide a spread lens and a light emitting device assembly using the same capable of improving a spread characteristic of light emitted from a light emitting element by forming concave-convex refraction parts on planar surfaces at both ends thereof.

In order to achieve the above-described object, in accordance with an aspect of the present invention, a spread lens spreading light emitted from a light emitting device may include a first lens surface through which the emitted light from the light emitting device is inputted; a second lens surface spreading inputted through the first lens surface to an outside; refraction parts which extend between both side ends of each of the first and second lens surfaces, are formed in a concave-convex shape, and refract the emitted light from the light emitting device; and support parts which extend at both side ends of the second lens surface and separate the refraction parts and the light emitting device from each other.

At this time, the refraction parts may be formed in any one concave-convex shape selected from a V shape, a lozenge shape, and a cone shape. It is preferable that a curvature radius of the first lens surface is smaller than that of the second lens surface.

The spread lens is formed of an optical glass or an optical synthetic resin. The optical glass may be made of BK7 or SK5. The optical synthetic resin may be made of a polycarbonate resin or a polymethyl acrylate resin.

In addition, in order to achieve the above-described object, in accordance with another aspect of the present invention, a light emitting device assembly may include a light emitting device package mounted with a light emitting device; and a spread lens spreading light emitted from the light emitting device package, wherein the spread lens may include a first lens surface through which the emitted light from the light emitting device is inputted; a second lens surface spreading the light inputted through the first lens surface to an outside; refraction parts which extend between both side ends of each of the first and second lens surfaces, are formed in a concave-convex shape, and refract the emitted light from the light emitting device; and support parts which extend at both side ends of the second lens surface and separate the refraction parts and the light emitting device from each other.

At this time, the refraction parts may be formed in any one concave-convex shape selected from a V shape, a lozenge shape, and a cone shape. A curvature radius of the first lens surface may be smaller than that of the second lens surface.

The spread lens is formed of an optical glass or an optical synthetic resin. The optical glass is made of BK7 or SK5. The optical synthetic resin is made of a polycarbonate resin or a polymethyl acrylate resin.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a cross-sectional view of a light emitting device assembly in prior art;

FIG. 2 is a graph illustrating a light emitting angle of FIG. 1;

FIG. 3 is a cross-sectional view of a spread lens in accordance with the present invention;

FIGS. 4 and 5 are cross-sectional views of a light emitting device assembly in accordance with the present invention;

FIG. 6 is a graph illustrating a light emitting angle of a light emitting device assembly in accordance with the present invention; and FIGS. 7 to 9 are cross-sectional views of an application example of a light emitting device assembly in accordance with the present invention.

DETAILED DESCRIPTION OF THE PREFERRED EMBODIMENTS

Figure 10A:
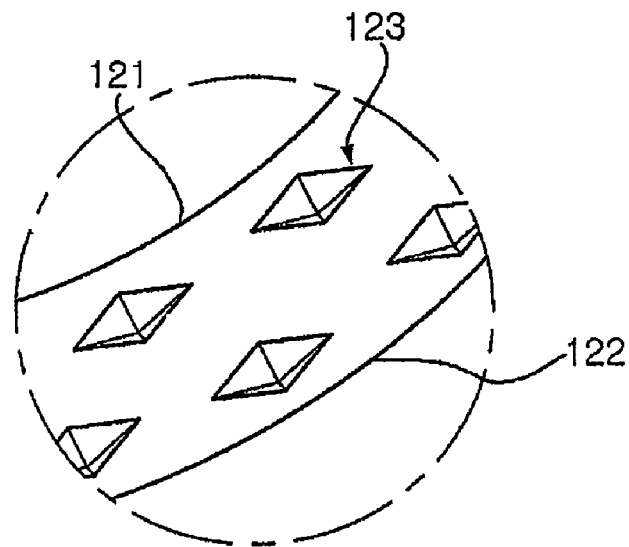
FIGS. 10A and 10B illustrate refraction parts which extend from first and second lens surfaces.
Figure 10B:
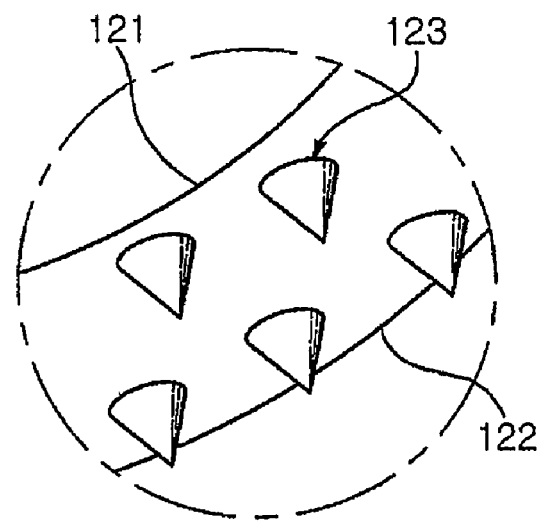

In accordance with the present invention, configurations and advantages of a spread lens and a light emitting device assembly using the same will be clearly appreciated from the following detailed description, taken in conjunction with the accompanying drawings in which preferred embodiments are illustrated.

Spread Lens

Hereinafter, a spread lens in accordance with an embodiment of the present invention will be described in detail with reference to the accompanying drawings.

FIG. 3 is a cross-sectional view of a spread lens in accordance with the present invention.

First, as shown in FIG. 3, a spread lens 120 in accordance with the present invention may include a first lens surface 121 through which light emitted from a light emitting device (not shown) is inputted, a second lens surface 122 spreading the light inputted through the first lens surface 121 to an outside, and refraction parts 123 which extend to both ends of each of the first and second lens surfaces 121 and 122, are formed in a concave-convex shape, and refract the emitted light from a light emitting device 112.

Herein, a center portion of the first lens surface 121 is formed in a convex shape to receive a light emitting device package 110 to be described below and light emitted from the light emitting device package 110 is inputted through the center portion of the first lens surface 121.

The second lens surface 122 is formed to correspond to the first lens surface 121, a center portion of the second lens surface 122 is convex, and a distance from the second surface 122 to the first lens surface 121 is lengthened at both ends of the second surface. That is, it is preferable that a curvature radius of the first lens surface 121 is smaller than that of the second lens surface 122 in the spread lens 120.

The refraction parts 123 of the concave-convex shape are formed at both ends of the first and second lens surfaces 121 and 122. The refraction parts 123 may be formed in any one concave-convex shape selected from a V shape, a lozenge shape, and a cone shape. The refraction parts 123 may be formed on a front surface of both side parts in a lower end of the spread lens 120 or on one surface connected to the first lens surface 121.

It is preferable that the spread lens 120 is formed of an optical glass or an optical synthetic resin. At this time, the optical glass may be formed by using BK7 or SK5. The optical synthetic resin may be made of a polycarbonate resin or a polymethyl acrylate resin.

Particularly, the spread lens 120 may further include support parts 124 extending downward at both side ends of the second lens surface 122. At this time, the support part 124 is made of a material different from the spread lens 120 and therefore does not extend on the spread lens 120 and may be fixed and coupled to the spread lens by an adhesive.

Light Emitting Device Assembly Using Spread Lens

FIGS. 4 and 5 are cross-sectional views of a light emitting device assembly in accordance with the present invention, and FIG. 6 is a graph illustrating a light emitting angle of the light emitting device assembly in accordance with the present invention.

First, as shown in FIG. 4, a light emitting device assembly 100 in accordance with the present invention may include a light emitting device package 110 mounted with a light emitting device 112 and a spread lens 120 for spreading light emitted from the light emitting device package 110.

Herein, the light emitting device package 110 may include a frame 111 with a concave portion 111a of which a center portion is cut in a predetermined depth to mount the light emitting device 112 and a molding part 113 filling an upper part of the frame 111 mounted with the light emitting device 112.

Meanwhile, it is preferable that the light emitting device 112 is an LED (Light Emitting Diode).

The above-described spread lens 120 is positioned in an upper part of the light emitting device package 110.

In the spread lens 120, a first lens surface 121 is positioned in insides of both side surfaces in an upper portion of the concave part 111a of the frame 111 mounted with the light emitting device 112 and support parts 124 are positioned on both side surfaces of the light emitting device package 110.

In particular, a refraction part 123 formed between both side ends of the first lens surface 121 and a second lens surface 122 is positioned on upper side ends of the concave portion 111a of the frame 111.

Since light emitted from the light emitting device 112 should be able to be refracted through the refraction part 123, it is preferable that the refraction part 123 is positioned on the upper side ends of the concave portion 111a.

The support parts 124 are positioned on both side surfaces of the light emitting device package 110. Each of the support parts 124 has a height so that the refraction part 123 of the spread lens 120 is not in contact with a top surface of the frame 111.

Unlike a conventional light emitting device assembly in which the spread lens 120 extends to both side surfaces of the light emitting device package 110, since the smaller spread lens 120 is positioned only on the light emitting device package 110 and the support parts 124 are positioned on the both side surfaces of the light emitting device package 110, the light emitting device assembly 100 of the above-described configuration may be miniaturized and slimmed.

As shown in FIG. 5, the light emitting device assembly 100 in accordance with the present invention, the light emitted from the light emitting device 112 is refracted and full-reflected by the refraction part 123 of the spread lens 120, thereby improving luminance in the range in which light luminance is lowered by miniaturization and slimness.

That is, as shown in FIG. 6, since the light emitting device assembly 100 in accordance with the present invention can maintain luminance the same as the conventional light emitting device assembly at an emission angle θ of the light emitting device 112 in the range of +80° to −80°, that is, approximately 155°, the light emitting device assembly 100 can improve light emitting efficiency lowered due to the miniaturization and slimness.

First Application Example of Light Emitting Device Assembly

FIG. 7 is a cross-sectional view of a first application example of a light emitting device assembly in accordance with the present invention.

In the first application example using the light emitting device assembly in accordance with the present invention, a plurality of light emitting device assemblies 100 of the above-described structure are mounted on a substrate 210 with a predetermined circuit pattern (not shown).

At this time, a heat sink 220 for radiating heat generated by the light emitting device assemblies 100 is positioned in a bottom part of the substrate 210.

The heat sink 220 may further have a plurality of plate-like heat radiating pieces 230 in a lower part of the heat sink 220 in order to improve efficiency of heat radiation.

The first application example of the light emitting device assemblies 100 having the above-described configuration may be used in an illuminator or a portable illuminator.

Second Application Example of Light Emitting Device Assembly

FIG. 8 is a cross-sectional view illustrating a second application example of a light emitting device assembly in accordance with the present invention.

In the second application example of the light emitting device assembly in accordance with the present invention, light emitting device assemblies 100 are mounted on a plurality of substrates 330 with a predetermined circuit pattern (not shown), and the plurality of substrates 330 mounted with the light emitting device assemblies 100 are connected to each other in parallel and are fixed and coupled to a case 310.

At this time, a plurality of passive devices 331 which can match with the light emitting device assemblies 100 may be formed on the substrates 330 in addition to the light emitting device assemblies 100.

A spread plate 320 made of a transparent material is coupled to an upper part of the case 310 with the plurality of substrates 330 connected to each other in parallel.

The second application of the light emitting device assemblies 100 in accordance with the present invention having the above-described configuration may be used in a fluorescent lamp, a lighting apparatus, an electric signboard on a road, and the like.

Third Application Example of Light Emitting Device Assembly

FIG. 9 is a cross-sectional view illustrating a third application example of a light emitting device assembly in accordance with the present invention.

The third application example of the light emitting device assembly 100 may include a plurality of lighting cases 410 mounted with the light emitting device assemblies 100, a fixing bar 420 for fixing the lighting cases 410, a support bar 430 for supporting the fixing bar 420, and a supporter 450 for fixing and coupling the support bar 430 to a ground surface.

At this time, the support bar 430 may further include a power supply unit 440 for supplying predetermined driving power to the light emitting device assemblies 100 mounted within the lighting cases 410.

The third application example using the light emitting device assembly in accordance with the present invention having the above-described configuration may be used as a street lamp installed on a circumstance of a road or a lighting apparatus in an event place.

The spread lens and the light emitting device assembly using the same can improve a spread characteristic of light emitted from a light emitting device by forming concave-convex refraction parts on planar surfaces at both ends thereof.

It is possible to miniaturize and slim the light emitting device assembly by reducing a thickness and a size of the spread lens.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A light emitting device assembly comprising:
   a light emitting device package mounted with a light emitting device; and
   a spread lens spreading light emitted from the light emitting device package,
   wherein the spread lens including:
      a first lens surface through which the emitted light from the light emitting device is inputted;
      a second lens surface spreading the light inputted through the first lens surface to an outside;
      a planar bottom surface extending between edges of the first and second lens surfaces;
      refraction parts formed on the planar bottom surface, and having a concave-convex shape for refracting the light emitted from the light emitting device; and
      a plurality of support parts extending downwardly from the planar bottom surface, the plurality of support parts receiving the light emitting device package therebetween separating the refraction parts and the light emitting device package from each other,
      wherein each of the plurality of support parts has a height greater than that of the light emitting device, and
      wherein bottom surfaces of the plurality of support parts are substantially coplanar with a bottom surface of the light emitting device package.

2. The light emitting device assembly according to claim 1, wherein the refraction parts are formed in any one concave-convex shape selected from a V shape, a lozenge shape, and a cone shape.

3. The light emitting device assembly according to claim 1, wherein a curvature radius of the first lens surface is smaller than that of the second lens surface.

4. The light emitting device assembly according to claim 1, wherein the light emitting device is an LED (Light Emitting Device).

5. The light emitting device assembly according to claim 1, wherein the plurality of support parts extend from the planar bottom surface in a direction perpendicular to the planar bottom surface.

6. The light emitting device assembly according to claim 1, wherein the spread lens is formed of an optical glass or an optical synthetic resin.

7. The light emitting device assembly according to claim 6, wherein the optical glass is made of BK7 or SK5.

8. The light emitting device assembly according to claim 6, wherein the optical synthetic resin is made of a polycarbonate resin or a polymethyl acrylate resin.

* * * * *